United States Patent
Zhang et al.

(10) Patent No.: US 10,477,397 B2
(45) Date of Patent: *Nov. 12, 2019

(54) METHOD AND APPARATUS FOR PASSPOINT EAP SESSION TRACKING

(71) Applicant: Time Warner Cable Enterprises LLC, St. Louis, MO (US)

(72) Inventors: Qiang Zhang, Mclean, VA (US); Arun Manroa, Herndon, VA (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/983,698

(22) Filed: May 18, 2018

(65) Prior Publication Data

US 2018/0270662 A1 Sep. 20, 2018

Related U.S. Application Data

(63) Continuation of application No. 14/921,011, filed on Oct. 23, 2015, now Pat. No. 9,980,134.

(51) Int. Cl.
*H04L 29/06* (2006.01)
*H04W 12/06* (2009.01)
*H04W 84/12* (2009.01)

(52) U.S. Cl.
CPC ............ *H04W 12/06* (2013.01); *H04L 63/08* (2013.01); *H04L 63/0876* (2013.01); *H04W 84/12* (2013.01)

(58) Field of Classification Search
CPC ...................................................... H04L 63/08

USPC ............................................................. 726/3
See application file for complete search history.

(56) References Cited

U.S. PATENT DOCUMENTS

| | | | | |
|---|---|---|---|---|
| 7,716,724 B2* | 5/2010 | Kuhn | ..................... | H04L 63/162 713/186 |
| 2004/0054905 A1* | 3/2004 | Reader | ................ | H04L 12/2856 713/171 |

OTHER PUBLICATIONS

RFC 5281—EAP-TTLS Security Protocol—Aug.2008.*

* cited by examiner

*Primary Examiner* — Longbit Chai
(74) *Attorney, Agent, or Firm* — Armis IP Law, LLC

(57) ABSTRACT

Systems and methods of tracking authentication sessions performed between Wi-Fi-enabled devices and authentication servers via wireless access points in Wi-Fi networks that allow authentication messages to be easily correlated to determine the authentication sessions to which the authentication messages belong. The systems and methods employ a tracking tag that an authentication server can insert into each authentication message that it sends to a Wi-Fi-enabled device via a wireless access point in an authentication session. By having the wireless access point echo the same tracking tag in each subsequent authentication message that it forwards to the authentication server, and storing each authentication message with its tracking tag in a database, the authentication messages stored in the database can be correlated using their tracking tags to determine the authentication session to which the respective authentication messages belong, thereby facilitating subsequent troubleshooting of the authentication session in the event of an unexpected failure.

24 Claims, 8 Drawing Sheets

Fig. 2 – Prior art

Type (State attribute): 24

Length: ≥ 3

String field (Tracking_Tag): < 255 characters

Type (Reply-Message attribute): 18

Length: ≥ 3

Text field (Tracking_Tag): < 255 characters

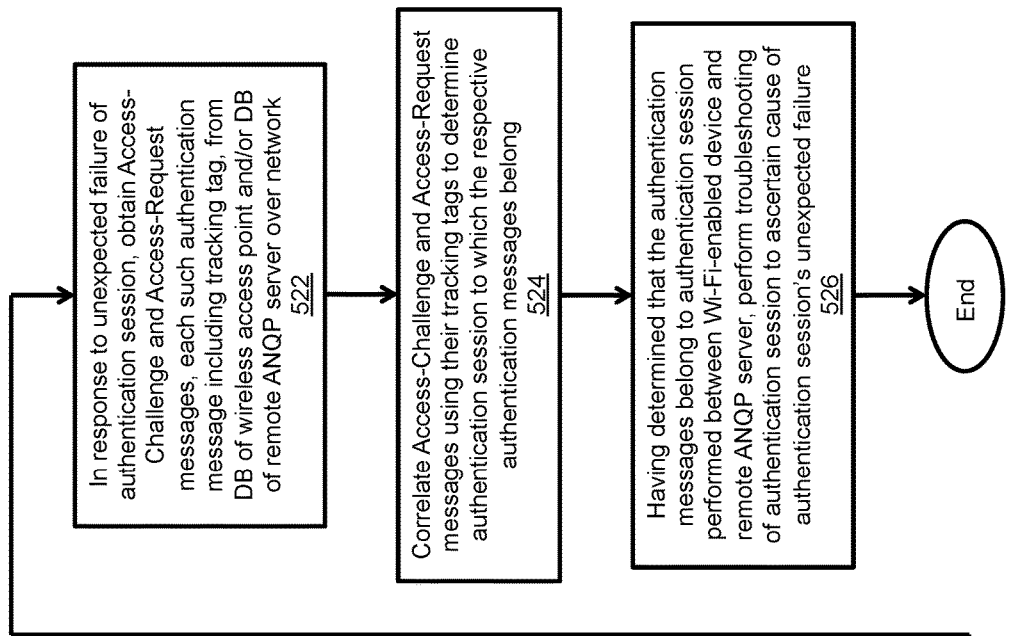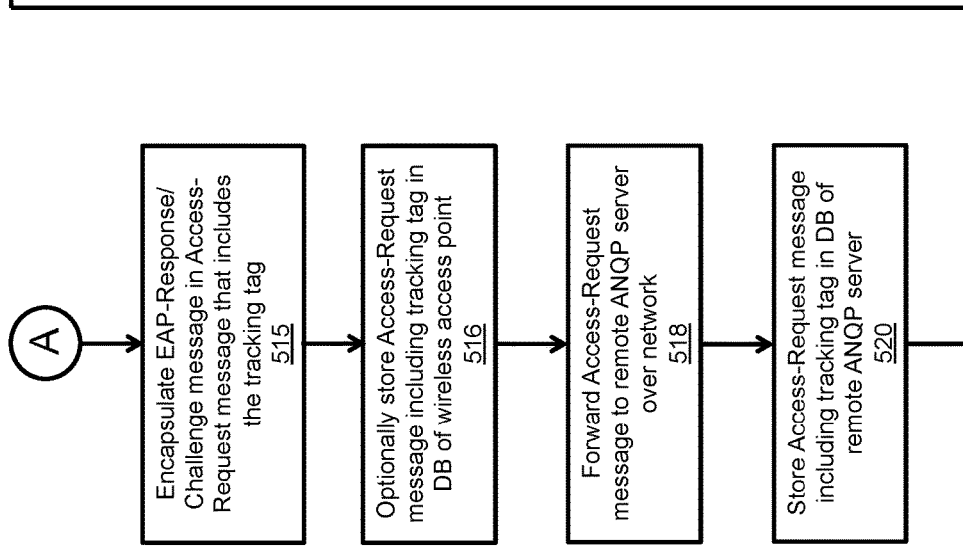
Fig. 5 (Cont.)

METHOD AND APPARATUS FOR PASSPOINT EAP SESSION TRACKING

RELATED APPLICATIONS

This application is a continuation of earlier filed U.S. patent application Ser. No. 14/921,011 entitled "METHOD AND APPARATUS FOR PASSPOINT EAP SESSION TRACKING," filed on Oct. 23, 2015, the entire teachings of which are incorporated herein by this reference.

The present application relates generally to systems and methods of accessing Wireless Fidelity (Wi-Fi) networks, and more specifically to systems and methods of tracking authentication sessions performed between Wi-Fi-enabled devices and authentication servers via wireless access points within such Wi-Fi networks.

TECHNICAL FIELD

Background

In recent years, Wireless Fidelity (Wi-Fi) networks have been increasingly deployed in urban areas, office buildings, and college campuses, as well as public venues such as airports, stadiums, and coffee shops. In response to such increased Wi-Fi network deployment, broadband service providers have sought to provide their mobile subscribers with the capability of accessing Wi-Fi networks in a manner that is easy, quick, and seamless. By providing easy, quick, and seamless access to Wi-Fi networks, such broadband service providers can assure that their mobile subscribers can have convenient access to the Internet from virtually any Wi-Fi-enabled device in a wide range of mobile environments.

In a typical scenario, a mobile subscriber with a Wi-Fi-enabled device (e.g., a Wi-Fi-enabled smartphone, tablet computer, or laptop computer) can enter a communication range of a wireless access point within a Wi-Fi network. For example, such a wireless access point may include a Wi-Fi controller configured to support Hotspot 2.0, which is a technology based on the Institute of Electrical and Electronic Engineers (IEEE) 802.11u, 802.11i, and 802.1x standards and generally known as Wi-Fi-certified Passpoint™. Having entered the communication range of the wireless access point, the Wi-Fi-enabled device can receive, from the wireless access point, a beacon message indicating that the wireless access point is configured to support Hotspot 2.0. If the Wi-Fi-enabled device is also configured to support Hotspot 2.0, then the Wi-Fi-enabled device can send, using the Access Network Query Protocol (ANQP) defined in the IEEE 802.11u standard, an ANQP query message to the wireless access point to determine what authentication types and/or protocols are supported within the Wi-Fi network. The wireless access point can receive the ANQP query message from the Wi-Fi-enabled device, and forward the ANQP query message to an ANQP server configured to provide ANQP service for the Wi-Fi network.

In response to the ANQP query message, the ANQP server can provide, in an ANQP response message, a list of supported authentication types and/or protocols to the wireless access point, which can forward the list of supported authentication types and/or protocols to the Wi-Fi-enabled device. For example, such authentication types and/or protocols supported within the Wi-Fi network may be based on the Extensible Authentication Protocol (EAP), and may include the EAP-Transport Layer Security (EAP-TLS), the EAP-Tunneled Transport Layer Security (EAP-TTLS), the EAP for GSM Subscriber Identity Module (EAP-SIM), the EAP Method for Universal Mobile Telecommunications System (UMTS) Authentication and Key Agreement (EAP-AKA), and/or any other suitable authentication types and/or protocols. The ANQP server can also provide, in an ANQP response message, a list of domain names of supported roaming service providers to the wireless access point, which can forward the list of domain names to the Wi-Fi-enabled device. Such a list of domain names can include the domain name of the mobile subscriber's broadband service provider.

In the event the mobile subscriber's broadband service provider is pre-registered in the Wi-Fi-enabled device, the Wi-Fi-enabled device can be associated with the wireless access point within the Wi-Fi network, as well as be authenticated by an authentication server within the broadband service provider's network, in a seamless fashion. Once the Wi-Fi-enabled device is associated with the wireless access point, the Wi-Fi-enabled device can initiate the EAP by sending an EAP-Start message to the wireless access point. In response to the EAP-Start message, the wireless access point can request the Wi-Fi-enabled device to identify itself by sending an EAP-Request/Identity message to the Wi-Fi-enabled device. For example, the Wi-Fi-enabled device may identify itself to the wireless access point by sending an EAP-Response/Identity message containing an anonymous user identifier (ID) of the Wi-Fi-enabled device. The wireless access point can receive the EAP-Response/Identity message from the Wi-Fi-enabled device, encapsulate the EAP-Response/Identity message in an Access-Request message, and forward the Access-Request message over the Internet to the authentication server within the broadband service provider's network. For example, such an Access-Request message may conform to the Remote Authentication Dial-In User Service (RADIUS) protocol, and include a Calling-Station-ID attribute that can be used for storing the MAC address of the Wi-Fi-enabled device, as well as an EAP-Identity attribute that can be used for storing the anonymous user ID of the Wi-Fi-enabled device. Further, the authentication server within the broadband service provider's network may be a RADIUS-based authentication server.

Having received the Access-Request message from the wireless access point, the authentication server within the broadband service provider's network can then engage in an authentication session with the Wi-Fi-enabled device via the wireless access point. During such an authentication session, the authentication server can send one of three possible messages to the wireless access point, namely, an Access-Reject message, an Access-Challenge message, or an Access-Accept message, each of which can conform to the RADIUS protocol. For example, in response to the Access-Request message from the wireless access point, the authentication server may send (1) an Access-Reject message to deny the Wi-Fi-enabled device access to the Wi-Fi network, (2) one or more Access-Challenge messages to request additional information from the Wi-Fi-enabled device before determining whether to deny or grant the Wi-Fi-enabled device access to the Wi-Fi network, or (3) an Access-Accept message to grant the Wi-Fi-enabled device access to the Wi-Fi network. The wireless access point can forward the Access-Reject message, the Access-Challenge message, or the Access-Accept message from the authentication server to the Wi-Fi-enabled device in an EAP-Request/Failure message, an EAP-Request/Challenge message, or an EAP-Request/Success message, as appropriate. The sending of a challenge message (Access-Challenge message, EAP-Request/Challenge message) from the authentication server to the Wi-Fi-enabled device via the wireless access point can lead to a further exchange of messages between the authentication server and the Wi-Fi-enabled device involving, for example, an exchange of shared keys (broadcast keys, session keys, Wireless Encryption Protocol (WEP) keys), as well as the encryption/decryption of exchanged messages using such shared keys.

The typical scenario described herein for accessing a Wi-Fi network using a Wi-Fi-enabled device has drawbacks, however, in that it can frequently be difficult to successfully troubleshoot an authentication session that might fail in an unexpected manner. For example, an authentication session might unexpectedly fail due to problems such as packet losses and/or latencies existing within the Wi-Fi network, the broadband service provider's network, and/or the Internet. However, it can be difficult if not impossible to correlate the many messages (e.g., Access-Request messages, Access-Reject messages, Access-Challenge messages, and/or Access-Accept messages) that can potentially be exchanged between an authentication server and the Wi-Fi-enabled device via a wireless access point in order to identify the authentication session to which the various messages belong. The inability to easily troubleshoot an unexpected authentication failure within a Wi-Fi network can hinder a broadband service provider's overall goal of providing optimal network service to its mobile subscribers.

It would therefore be desirable to have systems and methods of tracking authentication sessions performed between Wi-Fi-enabled devices and authentication servers via wireless access points within Wi-Fi networks that can overcome at least some of the drawbacks of existing authentication systems and methods.

SUMMARY

In accordance with the present application, systems and methods of tracking authentication sessions performed between Wireless Fidelity (Wi-Fi)-enabled devices and authentication servers via wireless access points within Wi-Fi networks are disclosed that allow authentication messages to be easily correlated for determining the authentication sessions to which the respective authentication messages belong. The disclosed systems and methods employ a tracking tag that an authentication server can insert into each authentication message that it sends to a Wi-Fi-enabled device via a wireless access point in an authentication session. By having the wireless access point echo the same tracking tag in each subsequent authentication message that it forwards to the authentication server in the authentication session, and storing each authentication message exchanged between the authentication server and the wireless access device with its tracking tag in a database, the authentication messages stored in the database can be correlated using their tracking tags to identify the authentication session to which the respective authentication messages belong, thereby facilitating subsequent troubleshooting of the authentication session in the event of an unexpected failure.

In one aspect, a system for tracking an authentication session performed between a Wi-Fi-enabled device and an authentication server via a wireless access point within a Wi-Fi network includes at least one Wi-Fi-enabled device, a wireless access point, and one or more authentication servers. For example, the Wi-Fi-enabled device may be a Wi-Fi-enabled smartphone, tablet computer, laptop computer, or any other suitable Wi-Fi-enabled device. Further, the wireless access point may include a Wi-Fi controller configured to support Hotspot 2.0, which is a technology based on the Institute of Electrical and Electronic Engineers (IEEE) 802.11u, 802.11i, and 802.1x standards and generally known as Wi-Fi-certified Passpoint™, or any other suitable wireless hotspot technology. In addition, the authentication servers may each be configured to conform to the Remote Authentication Dial-In User Service (RADIUS) protocol, or any other suitable protocol. The wireless access point can be deployed within a wireless local area network (WLAN), such as a Wi-Fi network that conforms to one or more of the IEEE 802.11 series of standards. In an exemplary aspect, the authentication servers can include a local RADIUS-based authentication server deployed within the Wi-Fi network, and/or a remote RADIUS-based authentication server deployed in a network external to the Wi-Fi network. Further, the local authentication server, the remote authentication server, and/or the wireless access point can each include a database for storing authentication information pertaining to an authentication session performed between the Wi-Fi-enabled device and the local or remote authentication server. The wireless access point can be communicably coupled to the local authentication server within the Wi-Fi network, and communicably coupleable to the remote authentication server over a communications network such as the Internet.

In one mode of operation, once the Wi-Fi-enabled device has been associated with the wireless access point within the Wi-Fi network, the Wi-Fi-enabled device can be authenticated by the local or remote authentication server (the "authentication server") in an authentication session, as follows. First, the Wi-Fi-enabled device can send an EAP-Start message to the wireless access point to specify that the wireless access point employ EAP. In response to the EAP-Start message, the wireless access point can send an EAP-Request/Identity message to the Wi-Fi-enabled device to request that the Wi-Fi-enabled device identify itself. In an exemplary aspect, the Wi-Fi-enabled device can identify itself to the wireless access point using an anonymous user identifier (ID). The Wi-Fi-enabled device can send an EAP-Response/Identity message containing the anonymous user ID to the wireless access point. The wireless access point can receive the EAP-Response/Identity message from the Wi-Fi-enabled device, encapsulate the EAP-Response/Identity message in an Access-Request message, and send the Access-Request message to the authentication server. For example, such an Access-Request message may conform to the RADIUS protocol, and may include a Calling-Station-ID attribute that can be used for storing the MAC address of the Wi-Fi-enabled device, as well as an EAP-Identity attribute that can be used for storing the anonymous user ID of the Wi-Fi-enabled device. Further, the authentication server may be a RADIUS-based authentication server.

Having received the Access-Request message including the Calling-Station-ID attribute that stores the MAC address of the Wi-Fi-enabled device and the EAP-Identity attribute that stores the anonymous user ID of the Wi-Fi-enabled device, the authentication server can send one of three possible authentication messages to the wireless access point, namely, an Access-Reject message, an Access-Challenge message, or an Access-Accept message, each of which can conform to the RADIUS protocol. For example, in response to the Access-Request message from the wireless access point, the authentication server may send (1) an Access-Reject message to deny the Wi-Fi-enabled device access to the Wi-Fi network, (2) one or more Access-Challenge messages to request additional information from the Wi-Fi-enabled device before determining whether to deny or grant the Wi-Fi-enabled device access to the Wi-Fi network, or (3) an Access-Accept message to grant the Wi-Fi-enabled device access to the Wi-Fi network. Each Access-Reject, Access-Challenge, and Access-Accept message sent by the authentication server can have an EAP-Request/Challenge message, an EAP-Request/Success message, or an EAP-Request/Failure message encapsulated therein, as appropriate. In an exemplary aspect, each Access-Reject message, Access-Challenge message, and Access-Accept message can also include a tracking tag that contains information for identifying the authentication session performed between the Wi-Fi-enabled device and the authentication server. For example, such a tracking tag may be implemented in an Access-Request message, an Access-Challenge message, and an Access-Accept message using a State attribute that conforms to the RADIUS protocol. Further, such a tracking tag may be implemented in an Access-Reject message using a Reply-Message attribute that also conforms to the RADIUS protocol. In an exemplary aspect, such session identifying information can include the domain name or Internet protocol (IP) address of the authentication server, the MAC address of the Wi-Fi-enabled device, a unique session identifier generated by the authentication server, and/or any other suitable information for identifying the authentication session performed between the Wi-Fi-enabled device and the authentication server.

In response to the Access-Request message that includes the Calling-Station-ID attribute storing the MAC address of the Wi-Fi-enabled device and the EAP-Identity attribute storing the anonymous user ID of the Wi-Fi-enabled device, the authentication server can encapsulate an EAP-Request/Challenge message in an Access-Challenge message, and send the Access-Challenge message with the tracking tag (stored in the State attribute) including the session identifying information to the wireless access point, which can forward the EAP-Request/Challenge message to the Wi-Fi-enabled device. In response to the EAP-Request/Challenge message, the Wi-Fi-enabled device can send an EAP-Response/Challenge message to the wireless access point, which can encapsulate the EAP-Response/Challenge message in another Access-Request message, and send the Access-Request message with the tracking tag (stored in the State attribute) including the session identifying information to the authentication server.

For the remainder of the authentication session performed between the Wi-Fi-enabled device and the authentication server, each Access-Request message, Access-Challenge message, and/or Access-Accept message exchanged between the wireless access point and the authentication server can include the tracking tag (stored in the State attribute) with the session identifying information. Each Access-Reject message sent by the authentication server to the wireless access point can likewise include the tracking tag (stored in the Reply-Message attribute) with the session identifying information. The wireless access point and/or the authentication server can store such authentication messages and/or information, namely, the Access-Request, Access-Challenge, Access-Accept, and/or Access-Reject messages (each authentication message including the tracking tag with the session identifying information) in its database for use in troubleshooting the authentication session in the event of an unexpected failure.

Having received the Access-Request message including the tracking tag with the session identifying information, the authentication server can again send an Access-Reject message, an Access-Challenge message, or an Access-Accept message to the wireless access point. For example, the authentication server may encapsulate an EAP-Request/Success message in an Access-Accept message, and send the Access-Accept message with the tracking tag (stored in the State attribute) including the session identifying information to the wireless access point, which can forward the EAP-Request/Success message to the Wi-Fi-enabled device to grant the Wi-Fi-enabled device access to the Wi-Fi network. Further, the authentication server may encapsulate an EAP-Request/Failure message in an Access-Reject message, and send the Access-Reject message with the tracking tag (stored in the Reply-Message attribute) including the session identifying information to the wireless access point, which can forward the EAP-Request/Failure message to the Wi-Fi-enabled device to deny the Wi-Fi-enabled device access to the Wi-Fi network. In the event of an unexpected failure of the authentication session prior to determining whether to grant or deny the Wi-Fi-enabled device access to the Wi-Fi network, a user operating a client computer can access or otherwise obtain the Access-Request, Access-Challenge, Access-Accept, and/or Access-Reject messages stored in the database(s) of the wireless access point and/or the authentication server, and correlate the Access-Request, Access-Challenge, Access-Accept, and/or Access-Reject messages using the tracking tag included in each authentication message in order to identify the authentication session to which the authentication messages belong.

By inserting a tracking tag with identifying information for an authentication session into each authentication message sent by an authentication server to a wireless access device, echoing the same tracking tag in each authentication message subsequently sent by the wireless access device to the authentication server, and storing each authentication message exchanged between the authentication server and the wireless access device with its tracking tag in a database, the authentication messages and/or information stored in the database can be correlated using the tracking tags for identifying the authentication session to which the respective authentication messages belong, thereby advantageously facilitating subsequent troubleshooting of the authentication session in the event of an unexpected failure.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings.

DETAILED DESCRIPTION

Systems and methods of tracking authentication sessions performed between Wireless Fidelity (Wi-Fi)-enabled devices and authentication servers via wireless access points within Wi-Fi networks are disclosed that allow authentication messages to be easily correlated for determining the authentication sessions to which the respective authentication messages belong. The disclosed systems and methods employ a tracking tag that an authentication server can insert into each authentication message that it sends to a Wi-Fi-enabled device via a wireless access point in an authentication session. By having the wireless access point echo the same tracking tag in each subsequent authentication message that it forwards to the authentication server in the authentication session, and storing each authentication message exchanged between the authentication server and the wireless access device with its tracking tag in a database, the authentication messages stored in the database can be correlated using their tracking tags to identify the authentication session to which the respective authentication messages belong, thereby facilitating subsequent troubleshooting of the authentication session in the event of an unexpected failure.

Figure 1:
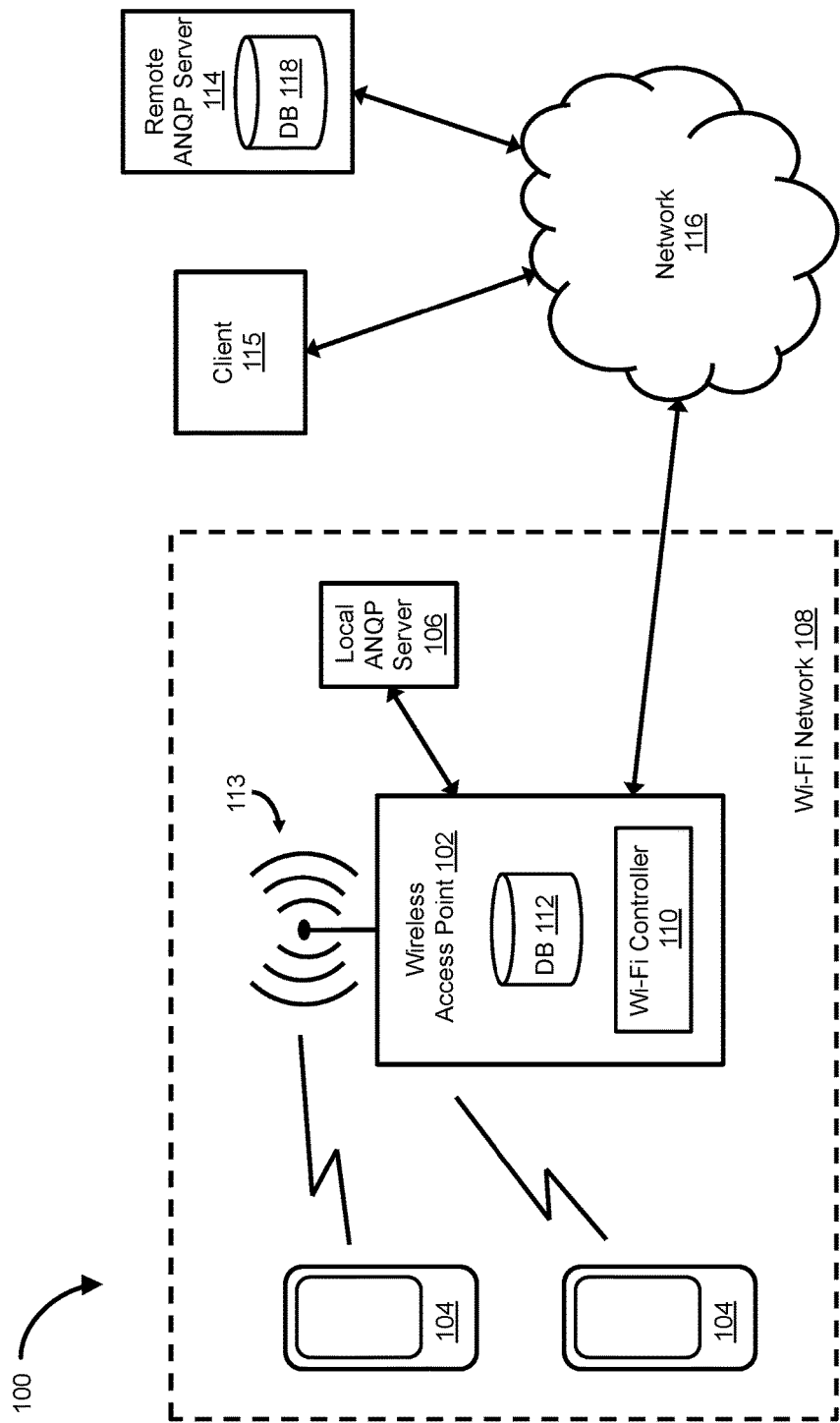
FIG. 1 is a block diagram illustrating an exemplary system for performing authentication sessions between Wi-Fi-enabled devices and authentication servers via a wireless access point within a Wi-Fi network.

FIG. 1 depicts an illustrative embodiment of an exemplary system 100 for tracking an authentication session performed between a Wi-Fi-enabled device and an authentication server via a wireless access point within a Wi-Fi network. As shown in FIG. 1, the system 100 can include a wireless access point 102, at least one Wi-Fi-enabled device 104, a local Access Network Query Protocol (ANQP) server 106, and a remote ANQP server 114. The wireless access point 102 can include an antenna 113, a Wi-Fi controller 110, and data storage such as a database (DB) 112. The remote ANQP server 114 can likewise include data storage, such as a DB 118. In one embodiment, the wireless access point 102 can be deployed within a wireless local area network (WLAN) such as a Wi-Fi network 108 that conforms to one or more of the Institute of Electrical and Electronic Engineers (IEEE) 802.11 series of standards, and can be communicably coupleable to the remote ANQP server 114 over a communications network 116 such as the Internet. The Wi-Fi-enabled device 104 can be a Wi-Fi-enabled smartphone, tablet computer, laptop computer, or any other suitable Wi-Fi-enabled device. Further, the Wi-Fi controller 110 can be configured to support Hotspot 2.0, which is a technology based on the IEEE 802.11u, 802.11i, and 802.1x standards and generally known as Wi-Fi-certified Passpoint™, or any other suitable wireless hotspot technology. In addition, the local and remote ANQP servers 106, 114 can each be configured to conform to the Remote Authentication Dial-In User Service (RADIUS) protocol defined in *RFC 2865 Remote Authentication Dial In User Service (RADIUS)*, June 2000 or latest revision, or any other suitable protocol. The system 100 can further include a client computer 115 that is communicably coupleable (such as over the network 116) to the wireless access point 102 and/or the remote ANQP server 114.

In an exemplary mode of operation, a user of the Wi-Fi-enabled device 104 can enter a communication range of the wireless access point 102 within the Wi-Fi network 108. For example, the user of the Wi-Fi-enabled device 104 may be a mobile subscriber of a broadband service provider. Having entered the communication range of the wireless access point 102, the Wi-Fi-enabled device 104 can receive, from the wireless access point 102, a beacon message indicating that the wireless access point 102 is configured to support Hotspot 2.0. If the Wi-Fi-enabled device 104 is also configured to support Hotspot 2.0, then the Wi-Fi-enabled device 104 can send, using the Access Network Query Protocol (ANQP) defined in the IEEE 802.11u standard, an ANQP query message to the wireless access point 102 to determine what authentication types and/or protocols are supported within the Wi-Fi network 108. The wireless access point 102 can receive the ANQP query message from the Wi-Fi-enabled device 104, and forward the ANQP query message to an authentication server such as the local ANQP server 106, which is configured to provide ANQP service for the Wi-Fi network 108.

In response to the ANQP query message, the local ANQP server 106 can provide, in an ANQP response message, a list of supported authentication types and/or protocols to the wireless access point 102, which can forward the list of supported authentication types and/or protocols to the Wi-Fi-enabled device 104. For example, such authentication types and/or protocols supported within the Wi-Fi network 108 may be based on the Extensible Authentication Protocol (EAP), and may include the EAP-Transport Layer Security (EAP-TLS), the EAP-Tunneled Transport Layer Security (EAP-TTLS), the EAP for GSM Subscriber identity Module (EAP-SIM), the EAP Method for Universal Mobile Telecommunications System (UMTS) Authentication and Key Agreement (EAP-AKA), and/or any other suitable authentication types and/or protocols. The local ANQP server 106 can also provide, in an ANQP response message, a list of domain names of supported roaming service providers to the wireless access point 102, which can forward the list of domain names to the Wi-Fi-enabled device 104. Such a list of domain names can include the domain name of the mobile subscriber's broadband service provider.

In the event the mobile subscriber's broadband service provider is pre-registered in the Wi-Fi-enabled device 104, the Wi-Fi-enabled device 104 can, in a seamless fashion, be associated with the wireless access point 102 within the Wi-Fi network 108, as well as be authenticated by an authentication server such as the remote ANQP server 114, which, in one embodiment, can be deployed within the broadband service provider's network (not shown). As employed herein, the term "associated with" encompasses a process by which the Wi-Fi-enabled device 104 can establish a data link with the wireless access point 102 within the Wi-Fi network 108. For example, the Wi-Fi-enabled device 104 may be associated with the wireless access point 102 by sending, to the wireless access point 102, an association request frame that includes the Wi-Fi-enabled device's service set identifier (SSID) and supported data rates. Further, once the wireless access point 102 receives the Wi-Fi-enabled device's SSID and supported data rates, the wireless access point 102 may send, to the Wi-Fi-enabled device 104, an association response frame that contains an association identifier (ID), as well as any other suitable information pertaining to the wireless access point 102.

As further employed herein, the term "authenticated by" encompasses a process by which the Wi-Fi-enabled device 104 can send, to the remote ANQP server 114 (or any other suitable authentication server) via the wireless access point 102, authentication credentials that identify the user of the Wi-Fi-enabled device 104 as being authorized to access the Wi-Fi network 108. For example, such authentication credentials may include the media access control (MAC) address of the Wi-Fi-enabled device 104, as well as the SSID of the broadband service provider's network. The Wi-Fi-enabled device 104 can be authenticated by the remote ANQP server 114 by sending, via the wireless access point 102, one or more authentication request frames to the remote ANQP server 114, and receiving, via the wireless access point 102, one or more authentication response frames from the remote ANQP server 114. Further, as part of the authentication process, the Wi-Fi-enabled device 104 can negotiate session keys with the remote ANQP server 114, and employ the session keys to protect authentication frames exchanged between the Wi-Fi-enabled device 104 and the remote ANQP server 114 using encryption and integrity checking.

Figure 2:
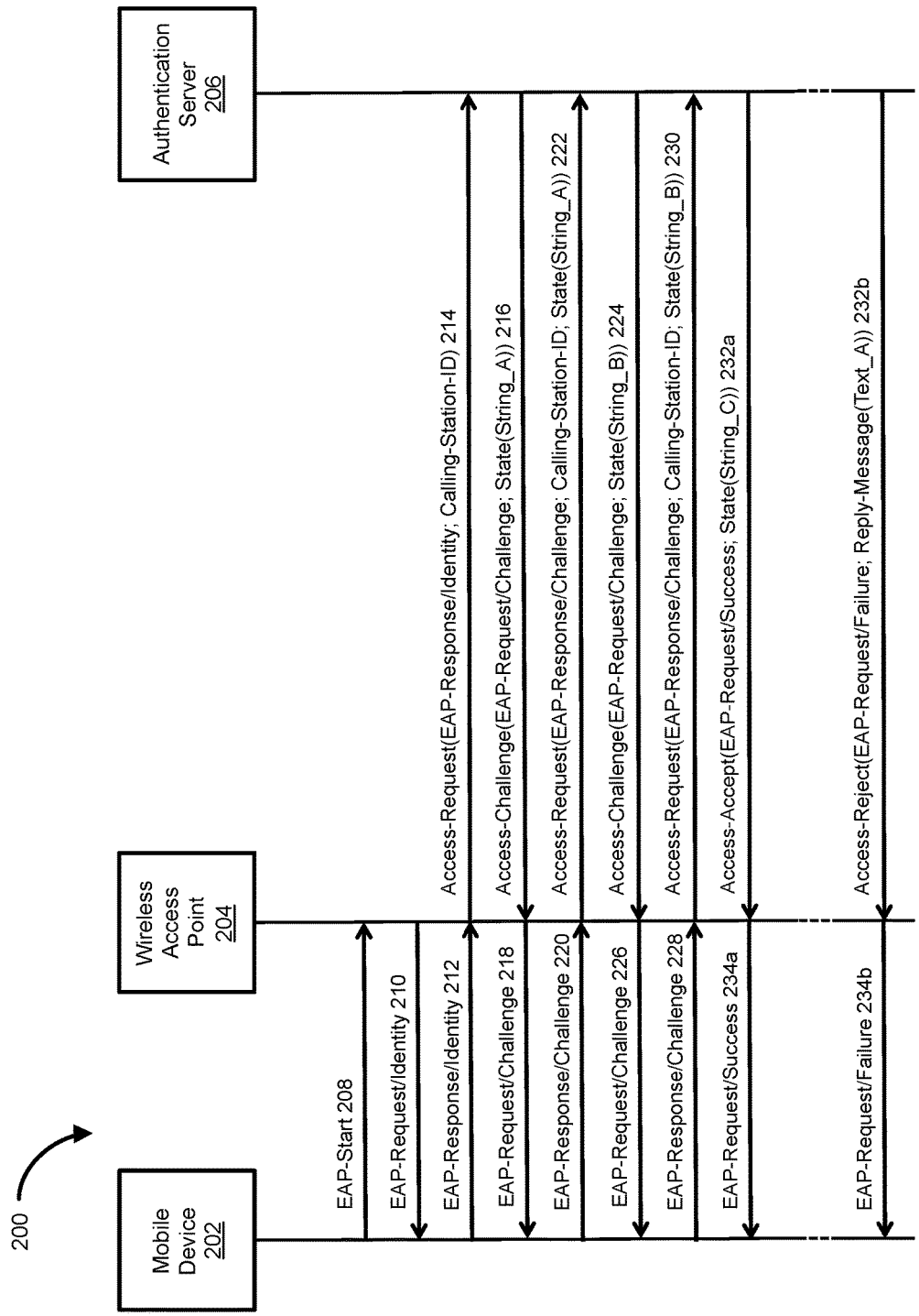
FIG. 2 is signaling diagram illustrating a conventional approach to performing an authentication session between a Wi-Fi-enabled device and an authentication server via a wireless access point within a Wi-Fi network.

FIG. 2 depicts a conventional approach 200 to performing an authentication session between a mobile device 202 (e.g., a Wi-Fi-enabled smartphone, tablet computer, laptop computer) and an authentication server 206 via a wireless access point 204 within a Wi-Fi network. Once the mobile device 202 is associated with the wireless access point 204, the mobile device 202 can specify that the wireless access point 204 employ EAP by sending an EAP-Start message 208 to the wireless access point 204. In response to the EAP-Start message 208, the wireless access point 204 can request the mobile device 202 to identify itself by sending an EAP-Request/Identity message 210 to the mobile device 202. For example, the mobile device 202 may identify itself to the wireless access point 204 by sending an EAP-Response/Identity message 212 containing an anonymous user identifier (ID) of the mobile device 202. The wireless access point 204 can receive the EAP-Response/Identity message 212 from the mobile device 202, encapsulate the EAP-Response/Identity message 212 in an Access-Request message 214, and forward the Access-Request message 214 to the authentication server 206. For example, the Access-Request message 214 may conform to the RADIUS protocol, and include a Calling-Station-ID attribute that can be used for storing the MAC address of the mobile device 202, and an EAP-Identity attribute that can be used for storing the anonymous user ID of the mobile device 202. Further, the authentication server 206 may be a RADIUS-based authentication server.

Having received the Access-Request message 214 including the Calling-Station-ID attribute that stores the MAC address of the mobile device 202 and the EAP-Identify attribute that stores the anonymous user ID of the mobile device 202, the authentication server 206 can encapsulate an EAP-Request/Challenge message (see also reference numeral 218) in an Access-Challenge message 216, and send the Access-Challenge message 216 to the wireless access point 204. For example, the Access-Challenge message 216 may conform to the RADIUS protocol, and include a State attribute that has a string field for storing an exemplary string, "String_A," which can be generated by the authentication server 206. The authentication server 206 can send the Access-Challenge message 216 that includes the State attribute storing the string, String_A, to the wireless access point 204, which can forward the EAP-Request/Challenge message 218 to the mobile device 202. The wireless access point 204 can receive an EAP-Response/Challenge message 220 from the mobile device 202, encapsulate the EAP-Response/Challenge message 220 in an Access-Request message 222, and send the Access-Request message 222 to the authentication server 206. As shown in FIG. 2, the Access-Request message 222 sent by the wireless access point 204 includes the Calling-Station-ID attribute that stores the MAC address of the mobile device 202, as well as the State attribute that stores the string, String_A, which was sent by the authentication server 206 to the wireless access point 204 in the Access-Challenge message 216.

Having received the Access-Request message 222 from the wireless access point 204, the authentication server 206 can decrypt the encrypted result included in the EAP-Response/Challenge message 220 in order to verify that the mobile device 202 has possession of the correct shared key. The authentication server 206 can also encapsulate at least one additional EAP-Request/Challenge message (see also reference numeral 226) in an Access-Challenge message 224. For example, the Access-Challenge message 224 may conform to the RADIUS protocol, and include a State attribute that has a string field for storing an exemplary string, "String_B," which can be generated by the authentication server 206. It is noted that the string, String_B, is typically different from the string, String_A, as well as any other State attribute string that might have been previously generated by the authentication server 206 during its authentication session with the mobile device 202.

The authentication server 206 can send the Access-Challenge message 224 that includes the State attribute storing the string, String_B, to the wireless access point 204, which can forward the EAP-Request/Challenge message 226 to the mobile device 202. The mobile device 202 can send an EAP-Response/Challenge message 228 including a further encrypted result to the wireless access point 204, which can encapsulate the EAP-Response/Challenge message 228 in an Access-Request message 230, and send the Access-Request message 230 to the authentication server 206. As shown in FIG. 2, the Access-Request message 230 sent by the wireless access point 204 includes the Calling-Station-ID attribute that stores the MAC address of the mobile device 202, as well as the State attribute that stores the string, String_B, which was provided by the authentication server 206 to the wireless access point 204 in the Access-Challenge message 224.

In response to the Access-Request message 230, the authentication server 206 can (1) encapsulate an EAP-Request/Success message (see also reference numeral 234*a*) in an Access-Accept message 232*a*, or (2) encapsulate an EAP-Request/Failure message (see also reference numeral 234*b*) in an Access-Reject message 232*b*, and send the Access-Accept message 232*a* or the Access-Reject message 232b to the wireless access point 204. For example, the Access-Accept message 232a may conform to the RADIUS protocol, and include a State attribute that has a string field for storing an exemplary string, "String_C," which can be generated by the authentication server 206. It is noted that the string, String_C, is typically different from both the string, String_A, and the string, String_B, as well as any other State attribute string that might have been previously generated by the authentication server 206 during its authentication session with the mobile device 202. Further, the Access-Reject message 232b may conform to the RADIUS protocol, and include a Reply-Message attribute that has a text field for storing an exemplary text, "Text_," which can be generated by the authentication server 206.

The wireless access point 204 can forward (1) the EAP-Request/Success message 234a to the mobile device 202, thereby granting the mobile device 202 access to the Wi-Fi network, or (2) the EAP-Request/Failure message 234b to the mobile device 202, thereby denying the mobile device 202 access to the Wi-Fi network. The conventional approach 200 to performing an authentication session between the mobile device 202 and the authentication server 206 has drawbacks, however, in that it can be difficult if not impossible to correlate the many authentication messages (e.g., the Access-Request messages 222, 230, the Access-Challenge messages 216, 224, the Access-Accept message 232a, and the Access-Reject message 232b) that can potentially be exchanged between the authentication server 206 and the mobile device 202 via the wireless access point 204 in order to identify the authentication session to which the various authentication messages belong.

Figure 3:
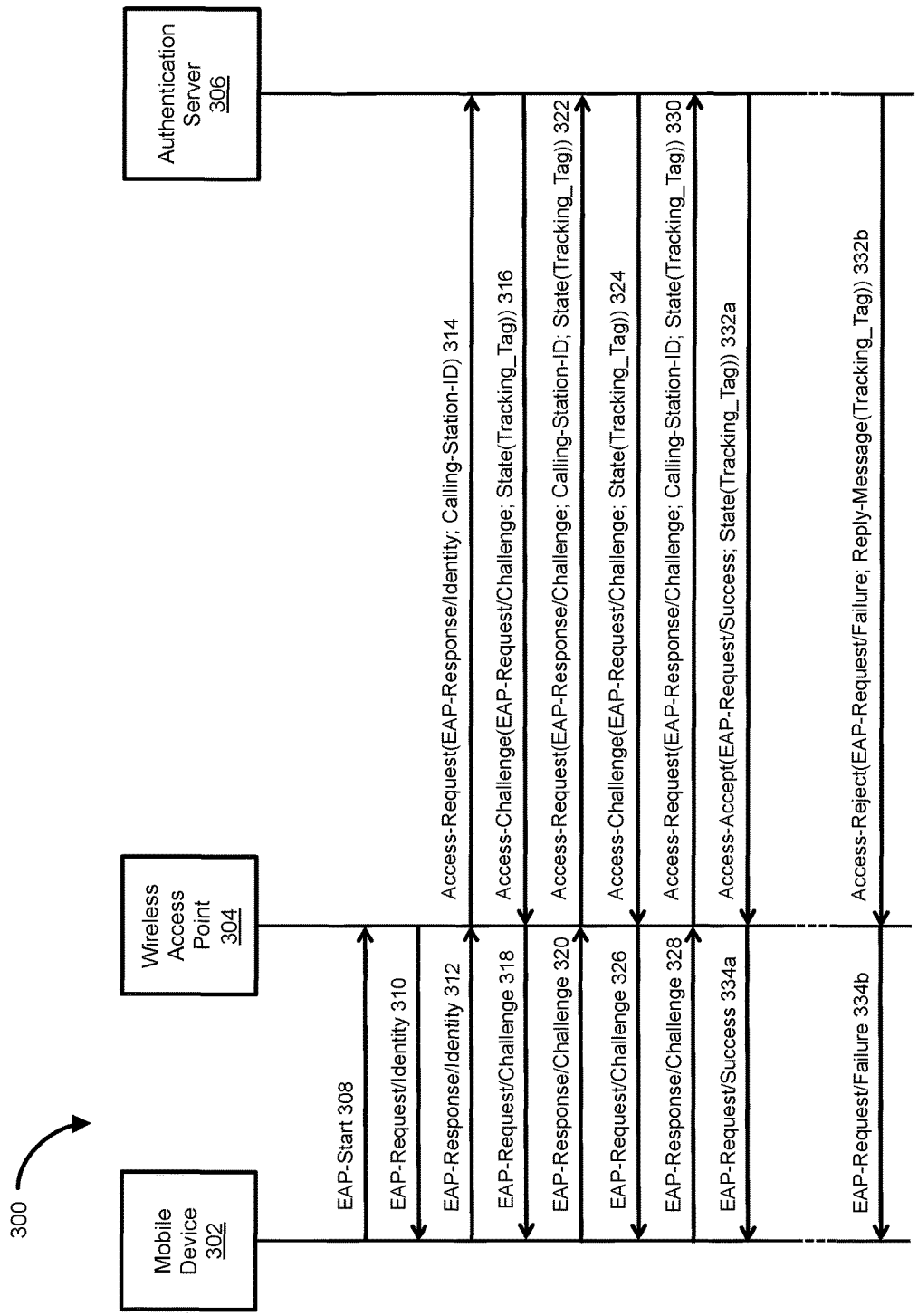
FIG. 3 is signaling diagram illustrating an exemplary approach to performing an authentication session between a Wi-Fi-enabled device and an authentication server via the wireless access point included in the system of FIG. 1, in accordance with the present application.

FIG. 3 depicts an exemplary approach 300 to performing an authentication session between a mobile device 302 and an authentication server 306 via a wireless access point 304 within a Wi-Fi network, in accordance with the present application. For example, the mobile device 302 may correspond to the Wi-Fi-enabled device 104, the authentication server 306 may correspond to the local or remote ANQP server 106, 114, and the wireless access point 304 may correspond to the wireless access point 102. The exemplary approach 300 illustrated in FIG. 3 allows authentication messages stored in the DB 112 of the wireless access point 102, and/or the DB 118 of the remote ANQP server 114, to be easily correlated using a tracking tag included in each authentication message to identify the authentication session to which the respective authentication messages belong.

As shown in FIG. 3, once the mobile device 302 is associated with the wireless access point 304, the mobile device 302 can specify that the wireless access point 304 employ EAP by sending an EAP-Start message 308 to the wireless access point 304. In response to the EAP-Start message 308, the wireless access point 304 can request the mobile device 302 to identify itself by sending an EAP-Request/Identity message 310 to the mobile device 302. For example, the mobile device 302 may identify itself to the wireless access point 304 by sending an EAP-Response/Identity message 312 containing the Media Access Control (MAC) address of the mobile device 302. The wireless access point 304 can receive the EAP-Response/Identity message 312 from the mobile device 302, encapsulate the EAP-Response/Identity message 312 in an Access-Request message 314, and forward the Access-Request message 314 to the authentication server 306. For example, the Access-Request message 314 may conform to the RADIUS protocol, and include a Calling-Station-ID attribute that can be used for storing the MAC address of the mobile device 302. Further, the authentication server 306 may be a RADIUS-based authentication server.

Having received the Access-Request message 314 including the Calling-Station-ID attribute that stores the MAC address of the mobile device 302, the authentication server 306 can encapsulate an EAP-Request/Challenge message (see also reference numeral 318) in an Access-Challenge message 316. For example, the Access-Challenge message 316 may conform to the RADIUS protocol, and include a State attribute that has a string field for storing an exemplary string denoted herein as the "tracking tag" or "Tracking_Tag," which can be inserted into the Access-Challenge message 316 by the authentication server 306 prior to sending the Access-Challenge message 316 to the wireless access point 304. Such a string, Tracking_Tag, can include information for identifying the authentication session performed between the mobile device 302 and the authentication server 306. In one embodiment, the string, Tracking_Tag, can be expressed, as follows:

$$\text{Tracking\_Tag: [ANQP Server FQDN/IP addr], [Mobile Device MAC addr], [Session ID]}, \qquad (1)$$

in which "ANQP Server FQDN/IP addr" corresponds to the Fully Qualified Domain Name (FQDN) or Internet protocol (IP) address of the authentication server 306, "Mobile Device MAC addr" corresponds to the MAC address of the mobile device 302, and "Session ID" corresponds to a unique session identifier generated by the authentication server 306. It is noted that the string, Tracking_Tag, can alternatively include any other suitable information for identifying the authentication session performed between the mobile device 302 and the authentication server 306.

Figure 4A:
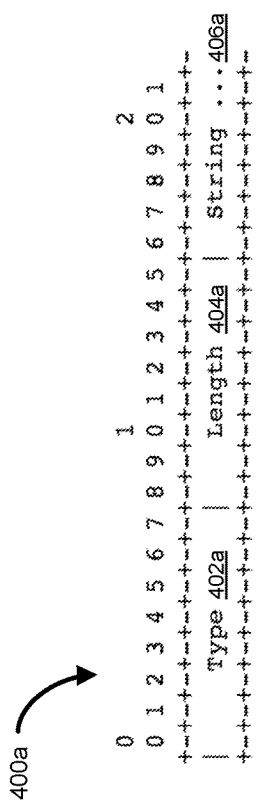
FIG. 4*a* is a diagram illustrating an exemplary format of a State attribute that can be included in an Access-Request message, an Access-Challenge message, and/or an Access-Accept message exchanged between an authentication server and the wireless access point included in the system of FIG. 1, for use in tracking an authentication session performed between a Wi-Fi-enabled device and the authentication server.

FIG. 4a depicts an exemplary format 400a of the State attribute that can be included in an Access-Request message, an Access-Challenge message, and/or an Access-Accept message exchanged between the authentication server 306 and the wireless access point 304. As shown in FIG. 4a, the State attribute includes a Type field 402a, a Length field 404a, and a String field 406a, which can be used to store the string denoted herein as the "tracking tag" or "Tracking_Tag" (see expression (1)). In accordance with the RADIUS protocol, the Type field 402a can include the value, "24," for the State attribute, the Length field 404a can be greater than or equal to the value, "3," and the String field 406a can include one or more octets containing binary data. In one embodiment, the String field 406a can be configured to accommodate octets of binary data representing up to 255 characters.

The authentication server 306 can store the Access-Challenge message 316 including the State attribute (storing the string, Tracking_Tag) in a database (such as the DB 118; see FIG. 1), and send the Access-Challenge message 316 to the wireless access point 304. The wireless access point 304 can likewise store the Access-Challenge message 316 in a database (such as the DB 112; see FIG. 1), and forward the EAP-Request/Challenge message 318 to the mobile device 302. The wireless access point 304 can receive an EAP-Response/Challenge message 320 from the mobile device 302, and encapsulate the EAP-Response/Challenge message 320 in an Access-Request message 322. As shown in FIG. 3, the Access-Request message 322 can include the Calling-Station-ID attribute that stores the MAC address of the mobile device 302, as well as the State attribute that stores the string, Tracking_Tag, which was originally sent by the authentication server 306 to the wireless access point 304 in the Access-Challenge message 316. The wireless access point 304 can store the Access-Request message 322 in its database (such as the DB 112; see FIG. 1), and send the Access-Request message 322 to the authentication server 306, which can likewise store the Access-Request message 322 in its database (such as the DB 118; see FIG. 1). In this way, the wireless access point 304 can effectively echo the string, Tracking_Tag, including the information identifying the authentication session performed between the mobile device 302 and the authentication server 306, in the Access-Request message 322 sent to the authentication server 306.

Having received the Access-Request message 322 from the wireless access point 304, the authentication server 306 can decrypt the encrypted result included in the EAP-Response/Challenge message 320 in order to verify that the mobile device 302 has possession of the correct shared key. The authentication server 306 can also encapsulate at least one additional EAP-Request/Challenge message (see also reference numeral 326) in an Access-Challenge message 324. For example, the Access-Challenge message 324 may conform to the RADIUS protocol, and include a State attribute that has a string field for storing the string, Tracking_Tag, which can include the same session identifying information as each of the Tracking_Tag strings inserted into the Access-Challenge message 316 and the Access-Request message 322.

The authentication server 306 can store the Access-Challenge message 324 in its database (such as the DB 118; see FIG. 1), and send the Access-Challenge message 324 including the State attribute (storing the string, Tracking_Tag) to the wireless access point 304. The wireless access point 304 can likewise store the Access-Challenge message 324 in its database (such as the DB 112; see FIG. 1), and forward the EAP-Request/Challenge message 326 to the mobile device 302. The mobile device 302 can send an EAP-Response/Challenge message 328 including a further encrypted result to the wireless access point 304. The wireless access point 304 can encapsulate the EAP-Response/Challenge message 328 in an Access-Request message 330, store the Access-Request message 330 in its database (such as the DB 112; see FIG. 1), and send the Access-Request message 330 to the authentication server 306, which can likewise store the Access-Request message 330 in its database (such as the DB 118; see FIG. 1). As shown in FIG. 3, the Access-Request message 330 sent by the wireless access point 304 includes the Calling-Station-ID attribute that stores the MAC address of the mobile device 302, as well as the State attribute that stores the string, Tracking_Tag, which was originally sent by the authentication server 306 to the wireless access point 304 in the Access-Challenge message 316. In this way, the wireless access point 304 can again effectively echo the string, Tracking_Tag, including the session identifying information, in the Access-Request message 330 sent to the authentication server 306.

In response to the Access-Request message 330, the authentication server 306 can (1) encapsulate an EAP-Request/Success message (see also reference numeral 334a) in an Access-Accept message 332a to grant the mobile device 302 access to the Wi-Fi network, or (2) encapsulate an EAP-Request/Failure message (see also reference numeral 334b) in an Access-Reject message 332b to deny the mobile device 302 access to the Wi-Fi network. The authentication server 306 can store the Access-Accept message 332a or the Access-Reject message 332b, as appropriate, in its database (such as the DB 118; see FIG. 1), and send the Access-Accept message 332a or Access-Reject message 332b to the wireless access point 304, which can likewise store the Access-Accept message 332a or the Access-Reject message 332b in its database (such as the DB 112; see FIG. 1). For example, the Access-Accept message 332a may conform to the RADIUS protocol, and include a State attribute that has a string field for storing the string, Tracking_Tag, which includes the information identifying the authentication session performed between the mobile device 302 and the authentication server 306. The Access-Reject message 332b may also conform to the RADIUS protocol, and include a Reply-Message attribute that has a text field for storing an exemplary text that can include the same session identifying information as the Tracking_Tag string included in the State attribute of the Access-Accept message 332a.

Figure 4B:
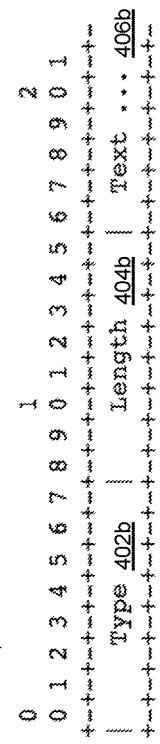
FIG. 4b is a diagram illustrating an exemplary format of a Reply-Message attribute that can be included in an Access-Reject message sent by an authentication server to the wireless access point included in the system of FIG. 1, for further use in tracking an authentication session performed between a Wi-Fi-enabled device and the authentication server.

FIG. 4b depicts an exemplary format 400b of the Reply-Message attribute that may be included in an Access-Reject message sent from the authentication server 306 to the wireless access point 304. As shown in FIG. 4b, the Reply-Message attribute includes a Type field 402b, a Length field 404b, and a Text field 406b, which can be used to store the text that includes the session identifying information (such text also denoted herein as the "tracking tag" or "Tracking_Tag"). In accordance with the RADIUS protocol, the Type field 402b can include the value, "18," for the Reply-Message attribute, the Length field 404b can be greater than or equal to the value, "3," and the Text field 406b can be configured to accommodate one or more octets containing up to 255 characters.

By inserting the Tracking_Tag string or text into each Access-Challenge message 316, 324, Access-Accept message 332a, and/or Access-Reject message 332b sent from the authentication server 306 to the wireless access point 304, echoing the Tracking_Tag string in each Access-Request message 322, 330 sent from the wireless access point 304 to the authentication server 306, and storing the Access-Challenge messages 316, 324, Access-Request messages 322, 330, Access-Accept message 332a, and/or Access-Reject message 332b with their Tracking_Tag strings or texts in data storage associated with one or both of the wireless access point 304 and the authentication server 306, the stored authentication messages can be correlated using the Tracking_Tag strings or texts for identifying the authentication session to which the respective authentication messages belong, thereby facilitating subsequent troubleshooting of the authentication session in the event of an unexpected failure.

Figure 5:
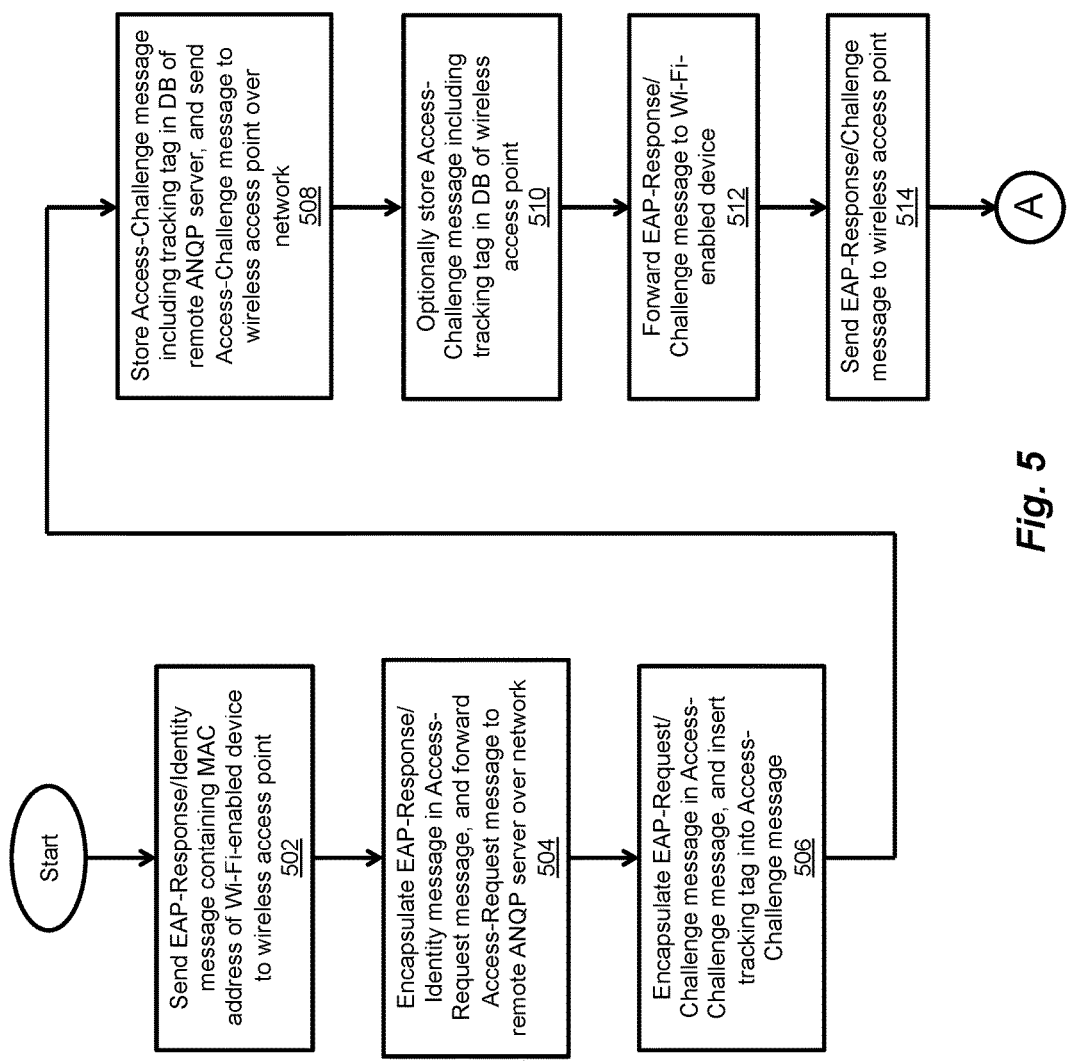
FIG. 5 is a flow diagram of an exemplary method of tracking and troubleshooting an authentication session performed between a Wi-Fi-enabled device and an authentication server via the wireless access point included in the system of FIG. 1.

FIG. 5 depicts an exemplary method of tracking and troubleshooting an authentication session performed between the Wi-Fi-enabled device 104 and the remote ANQP server 114 over the network 116 via the wireless access point 102 within the Wi-Fi network 108 (see FIG. 1). As depicted in block 502 (see FIG. 5), once an EAP-Request/Identity message is received at the Wi-Fi-enabled device 104 from the wireless access point 102, an EAP-Response/Identity message containing the MAC address of the Wi-Fi-enabled device 104 is sent, by the Wi-Fi-enabled device 104, to the wireless access point 102. As depicted in block 504, the EAP-Response/Identity message is encapsulated, by the wireless access point 102, in an Access-Request message, which is forwarded, by the wireless access point 102, to the remote ANQP server 114 over the network 116. As depicted in block 506, an EAP-Request/Challenge message is encapsulated, by the remote ANQP server 114, in an Access-Challenge message, and a tracking tag is inserted, by the remote ANQP server 114, into the Access-Challenge message. The tracking tag includes information for identifying the authentication session performed between the Wi-Fi-enabled device 104 and the remote ANQP server 114. As depicted in block 508, the Access-Challenge message including the tracking tag is stored, by the remote ANQP server 114, in the DB 118, and sent, by the remote ANQP server 114, to the wireless access point 102 over the network 116. As depicted in block 510, the Access-Challenge message including the tracking tag is optionally stored, by the wireless access point 102, in the DB 112. As depicted in block 512, the EAP-Response/Challenge message is forwarded, by the wireless access point 102, to the Wi-Fi-enabled device 104. As depicted in block 514, an EAP-Response/Challenge message is sent, by the Wi-Fi-enabled device 104, to the wireless access point 102. As depicted in block 515, the EAP-Response/Challenge message is encapsulated, by the wireless access point 102, in an Access-Request message that includes the tracking tag. As depicted in block 516, the Access-Request message including the tracking tag is optionally stored, by the wireless access point 102, in the DB 112. As depicted in block 518, the Access-Request message is forwarded, by the wireless access point 102, to the remote ANQP server 114 over the network 116. As depicted in block 520, the Access-Request message including the tracking tag is stored, by the remote ANQP server 114, in the DB 118. As depicted in block 522, in response to an unexpected failure of the authentication session, the Access-Challenge message and the Access-Request message, each such authentication message including the tracking tag, are accessed or otherwise obtained, by the client computer 115, from the DB 112 and/or the DB 118 over the network 116. As depicted in block 524, the Access-Challenge and Access-Request messages are correlated, by the client computer 115 using their tracking tags, to determine the authentication session to which the respective authentication messages belong. As depicted in block 526, having determined that the authentication messages belong to the authentication session performed between the Wi-Fi-enabled device 104 and the remote ANQP server 114, troubleshooting of the authentication session is performed, by a user operating the client computer 115, to ascertain the cause of the authentication session's unexpected failure.

Although exemplary systems and methods have been described herein relative to specific illustrative embodiments thereof, they are not so limited. Indeed, many modifications and variations may become apparent in light of the above teachings. For example, it was described herein, with reference to FIG. 3, that a Tracking_Tag string or text can be inserted into each Access-Challenge message, Access-Accept message, and/or Access-Reject message sent from the authentication server 306 to the wireless access point 304, and transmitted back (i.e., echoed) in each Access-Request message sent from the wireless access point 304 to the authentication server 306. For example, such a Tracking_Tag string or text can contain information for identifying an authentication session performed between the mobile device 302 and the authentication server 306, such as the FQDN or IP address of the authentication server 306, the MAC address of the mobile device 302, and a unique session identifier generated by the authentication server 306. In an alternative embodiment, the State attribute included in pairs of corresponding Access-Challenge and Access-Request messages (or any other suitable pairs of authentication messages) can further include a string (or text) that is randomly generated by the authentication server 306.

Figure 6:
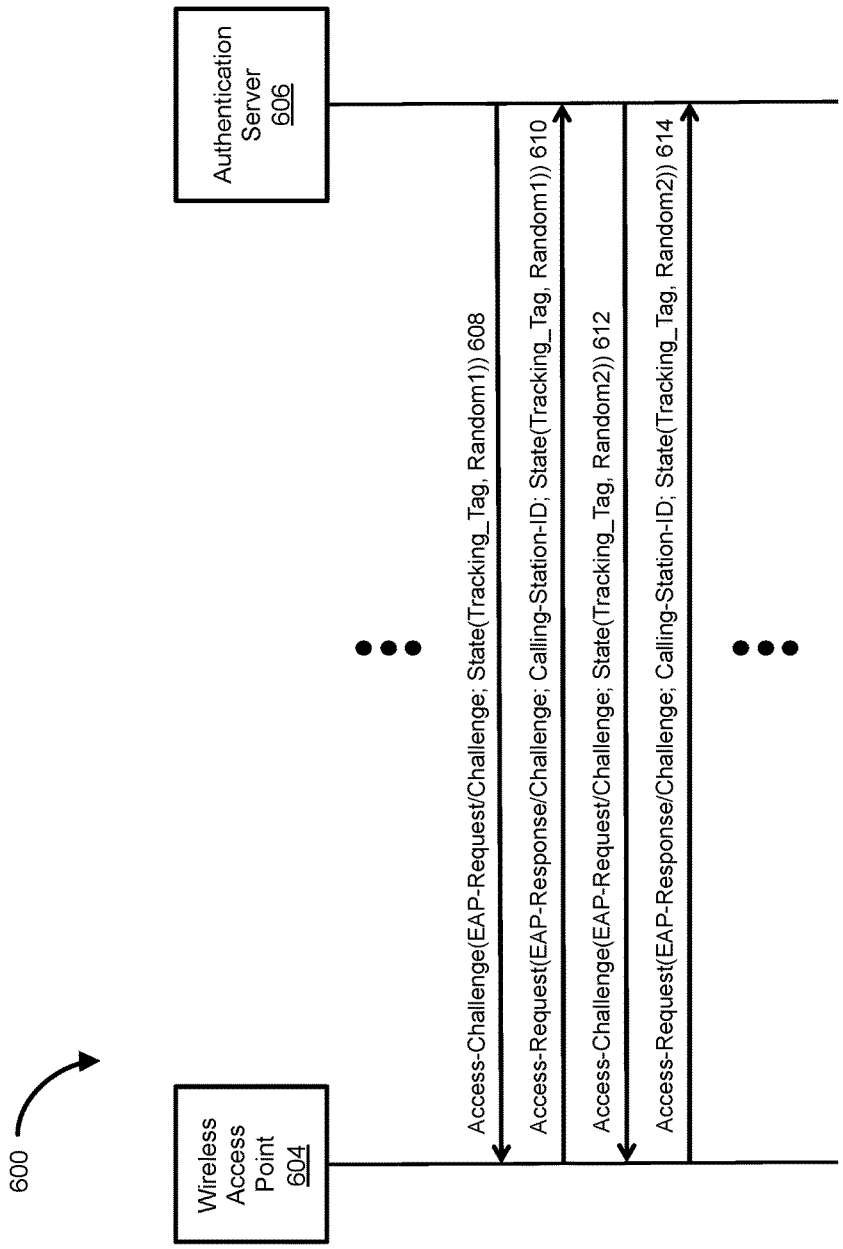
FIG. 6 is signaling diagram illustrating an exemplary alternative approach to performing an authentication session between a Wi-Fi-enabled device and an authentication server via the wireless access point included in the system of FIG. 1.

FIG. 6 depicts an exemplary alternative approach 600 to performing an authentication session between a mobile device (not shown) and an authentication server 606 via a wireless access point 604 within a Wi-Fi network. In the alternative approach 600 of FIG. 6, just the exchange of authentication messages (e.g., Access-Challenge messages, Access-Request messages) between the wireless access point 604 and the authentication server 606 are depicted for clarity of illustration. As shown in FIG. 6, the authentication server 606 can encapsulate an EAP-Request/Challenge message in an Access-Challenge message 608. For example, the Access-Challenge message 608 may conform to the RADIUS protocol, and include a State attribute that has a string field for storing an exemplary string denoted herein as the "tracking tag" or "Tracking_Tag," as well as a further exemplary string denoted herein as "Random1," each of which can be generated and inserted into the Access-Challenge message 608 by the authentication server 606. It is noted that the Tracking_Tag string included in the State attribute of the Access-Challenge message 608 can be like the Tracking_Tag string described herein with reference to FIG. 3. The authentication server 606 can store the Access-Challenge message 608 including the State attribute (storing the strings, Tracking_Tag and Random1) in a database (such as the DB 118; see FIG. 1), and send the Access-Challenge message 608 to the wireless access point 604, which can likewise store the Access-Challenge message 608 in a database (such as the DB 112; see FIG. 1).

As further shown in FIG. 6, the wireless access point 604 can encapsulate an EAP-Response/Challenge message in an Access-Request message 610, which can include a Calling-Station-ID attribute that stores the MAC address of the mobile device (not shown), as well as the State attribute that stores the strings, Tracking_Tag and Random1, each of which were originally sent by the authentication server 606 to the wireless access point 604 in the Access-Challenge message 608. The wireless access point 604 can store the Access-Request message 610 in its database (such as the DB 112; see FIG. 1), and send the Access-Request message 610 to the authentication server 606, which can likewise store the Access-Request message 610 in its database (such as the DB 118; see FIG. 1). In this way, the wireless access point 604 can effectively echo both of the strings, Tracking_Tag and Random1, in the Access-Request message 610 sent to the authentication server 606.

The authentication server 606 can encapsulate a further EAP-Request/Challenge message in an Access-Challenge message 612. For example, the Access-Challenge message 612 may conform to the RADIUS protocol, and include a State attribute that has a string field for storing the Tracking_Tag string, as well as a further exemplary string denoted herein as "Random2," each of which can be generated and inserted into the Access-Challenge message 612 by the authentication server 606. It is noted that the string, Random2, can be a randomly generated string that is different from the string, Random1, which can also be a randomly generated string. The authentication server 606 can store the Access-Challenge message 612 including the State attribute (storing the strings, Tracking_Tag and Random2) in a database (such as the DB 118; see FIG. 1), and send the Access-Challenge message 612 to the wireless access point 604, which can likewise store the Access-Challenge message 612 in a database (such as the DB 112; see FIG. 1).

The wireless access point 604 can encapsulate a further EAP-Response/Challenge message in an Access-Request message 614, which can include a Calling-Station-ID attribute that stores the MAC address of the mobile device (not shown), as well as the State attribute that stores the strings, Tracking_Tag and Random2, each of which were originally sent by the authentication server 606 to the wireless access point 604 in the Access-Challenge message 612. The wireless access point 604 can store the Access-Request message 614 in its database (such as the DB 112; see FIG. 1), and send the Access-Request message 614 to the authentication server 606, which can likewise store the Access-Request message 614 in its database (such as the DB 118; see FIG. 1). In this way, the wireless access point 604 can effectively echo both of the strings, Tracking_Tag and Random2, in the Access-Request message 614 sent to the authentication server 606.

By inserting the Tracking_Tag string into each Access-Challenge message 608, 612 sent from the authentication server 606 to the wireless access point 604, echoing the Tracking_Tag string in each Access-Request message 610, 614 sent from the wireless access point 604 to the authentication server 606, and storing the Access-Challenge messages 608, 612 and Access-Request messages 610, 614 with their Tracking_Tag strings in data storage associated with one or both of the wireless access point 604 and the authentication server 606, the stored authentication messages can be correlated using the Tracking_Tag strings for identifying the authentication session to which the respective authentication messages belong.

In addition, by inserting the Random1 string and the Random2 string into the Access-Challenge message 608 and the Access-Challenge message 612, respectively, echoing the Random1 string and the Random2 string in the Access-Request message 610 and the Access-Request message 614, respectively, and storing the Access-Challenge and Access-Request message pair 608, 610 with their Random1 strings, as well as the Access-Challenge and Access-Request message pair 612, 614 with their Random2 strings, in data storage associated with one or both of the wireless access point 604 and the authentication server 606, the stored authentication messages can be further correlated using the Random1 and Random2 strings (or any other suitable additional tracking tags) to identify pairs of corresponding Access-Challenge/Access-Request messages (or any other suitable pairs of authentications messages) exchanged between the wireless access point 604 and the authentication server 606.

Figure 7:
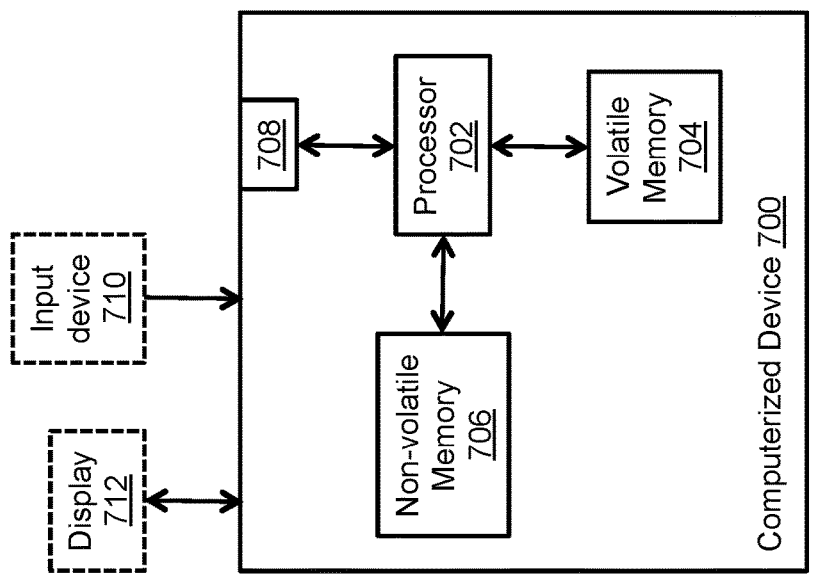
FIG. 7 is a block diagram of an exemplary computerized device upon which systems and methods described herein can be implemented.

A number of the exemplary systems and methods described herein can be implemented, at least in part, with any of a variety of server computers, client computers, and/or computerized devices. FIG. 7 depicts an illustrative embodiment of an exemplary computerized device 700, which includes a processor 702 coupled to a volatile memory 704 and a non-volatile memory 706. The computerized device 700 can further include a network access port 708 for establishing a data connection with other computer(s) and/or computerized device(s) over a network, as well as an input device 710 (a keyboard, a mouse, a track pad) and a display 712 (a liquid crystal display (LCD) display, a light emitting diode (LED) display).

Figure 8:
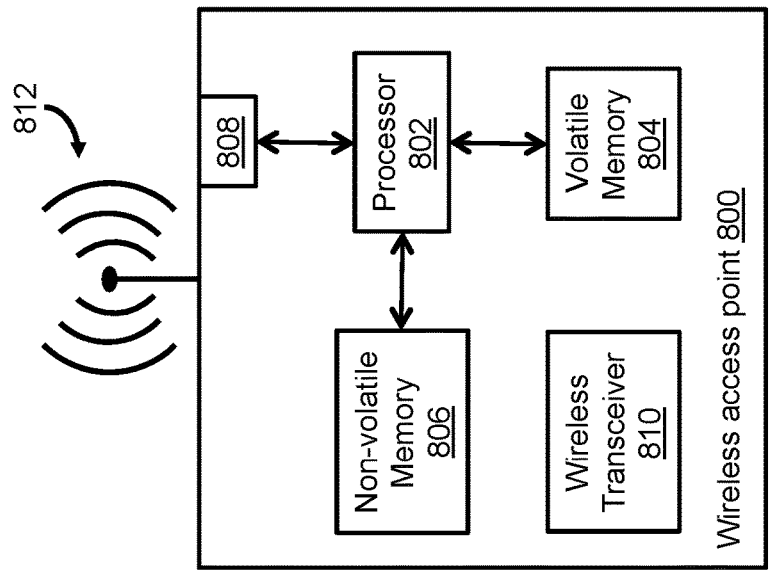
FIG. 8 is a block diagram of an exemplary wireless access point upon which systems and methods described herein can be implemented.

FIG. 8 depicts an illustrative embodiment of an exemplary computerized wireless access point 700, which includes a processor 802 coupled to a volatile memory 804 and a non-volatile memory 806. Like the computerized device 700 of FIG. 7, the wireless access point 800 of FIG. 8 can further include a network access port 808 for establishing a data connection with one or more computers and/or computerized devices over a network. The wireless access point 800 can still further include a wireless transceiver 810 for establishing wireless communications with one or more mobile devices via an antenna 812. The wireless transceiver 810 can conform to one or more of the IEEE 802.11 series of standards, or any other suitable wireless standards.

The foregoing method descriptions and the process flow diagrams are provided herein merely as illustrative examples, and are not intended to require or imply that the steps of the various embodiments must be performed in the order presented. One of ordinary skill in the art will appreciate that the order of steps in the foregoing embodiments can be performed in any suitable order. Further, terms such as "thereafter," "then," "next," etc., are not intended to limit the order of the steps. In addition, any references to claim elements in the singular, e.g., using the articles "a," "an," or "the," are not to be construed as limiting the respective claim elements to the singular.

The various illustrative logical blocks, modules, circuits, and/or algorithmic steps described in connection with the embodiments disclosed herein can be implemented as electronic hardware, computer software, or combinations of both. To illustrate this interchangeability of hardware and software, various illustrative components, blocks, modules, circuits, and/or steps have been described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present application. The functionality of various logical blocks described herein can be performed by any other suitable logical blocks and/or circuits, and/or any other suitable additional logical blocks and/or circuits that are not separately illustrated herein.

The hardware used to implement the various illustrative logical blocks, modules, and/or circuits described in connection with the aspects disclosed herein can be implemented or performed with a general purpose processor, a digital signal processor (DSP), an application specific integrated circuit (ASIC), a field programmable gate array (FPGA), and/or other programmable logic device, discrete gate or transistor logic, discrete hardware components, and/or any combination thereof designed to perform the functions described herein. A general purpose processor can be a microprocessor, however the processor can be any other suitable processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Alternatively, some blocks and/or methods described herein can be performed by circuitry that is specific to a given function.

In one or more exemplary aspects, the functions described herein can be implemented in hardware, software, firmware, or any combination thereof. If implemented in software, the functions can be stored as one or more instructions or code on a computer-readable medium. The blocks of a method or algorithm disclosed herein can be embodied in a processor-executable software module, which can reside on a computer-readable medium. Computer-readable media can include both computer storage media and communication media, including any medium that facilitates transfer of a computer program from one place to another. Storage media can be any available media that can be accessed by a computer. By way of example and not limitation, such computer-readable media can comprise RAM, ROM, EEPROM, CD-ROM or other optical disk storage, magnetic disk storage or other magnetic storage devices, and/or any other suitable medium that can be used to carry or store desired program code in the form of instructions and/or data structures and that can be accessed by a computer. Any connection can also be properly termed as a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of the medium. The terms "disk" and "disc," as employed herein, can include compact discs (CD), laser discs, optical discs, digital versatile discs (DVD), hard disks, floppy disks, and/or Blu-Ray discs. In addition, the operations of a method or algorithm can reside as one or any combination or set of codes and/or instructions on a machine readable medium and/or computer-readable medium, which can be incorporated into a computer program product.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

We claim:

1. A method of performing authentication between a mobile communication device and an authentication server, the method comprising:
   at the authentication server operable to authenticate communication devices in communication with a wireless access point:
      receiving a request message from the wireless access point to authenticate the mobile communication device;
      assigning a unique identifier value to an authentication session of authenticating the mobile communication device; and
      communicating a response message to the wireless access point, the response message including: a) the unique identifier value assigned to the authentication session, the unique identifier supplemental data with respect to the unique identifier value, wherein the supplemental data is different from the unique authentication session identifier; and
   wherein the wireless access point echoes the unique authentication session identifier and the supplemental data transmitted from the wireless access point to the authentication server, the wireless access point communicating the reply message authentication server, a combination of the unique authentication session identifier value and the received supplemental data being used to track the response message and the reply message associated with the request message.

2. The method as in claim 1 further comprising:
   storing the response message in a repository; and
   utilizing the unique identifier value in the repository to track multiple messages associated with the authentication session between the wireless access point and the authentication server.

3. The method as in claim 1 further comprising:
   inserting the unique identifier value in a data field of the response message to the wireless access point, the wireless access point operable to use the unique identifier value in the response message to identify multiple messages associated with the authentication session.

4. The method as in claim 1, wherein the unique identifier value is extra data with respect to network address information in the response message.

5. The method as in claim 1 further comprising:
   receiving the request message from the wireless access point in response to the wireless access point receiving a request from the mobile communication device to access a network through the wireless access point.

6. The method as in claim 1, wherein the request message is an encapsulation message received from the wireless access point, the encapsulation message including a communication generated by the mobile communication device.

7. The method as in claim 1, wherein the response message is an encapsulation message including the unique identifier value and a communication to the mobile communication device.

8. The method as in claim 1, wherein the supplemental data includes a first random number.

9. The method as in claim 8, wherein the response message is a first response message, the method further comprising:
   generating a second response message including a second random number and the unique identifier value; and
   communicating the second response message to the wireless access point.

10. The method as in claim 9 further comprising:
    receiving a first reply message from the wireless access point, the wireless access point generating the first reply message as a response to the first response message, the received first reply message from the wireless access point including the first random number along with the unique identifier value; and
    receiving a second reply message from the wireless access point, the wireless access point generating the second reply message as a response to the second response message, the received second reply message from the wireless access point including the second random number along with the unique identifier value.

11. The method as in claim 10, wherein the first random number tracks a first pair of communications between the wireless access point and the authentication server, the first pair of communications including the first response message and the first reply message; and
    wherein the second random number tracks a second pair of communications between the wireless access point and the authentication server, the second pair of communications including the second response message and the second reply message.

12. The method as in claim 8 further comprising:
    receiving a reply message from the wireless access point, the wireless access point generating the reply message as a response to the response message received from the authentication server, the received reply message from the wireless access point including the first random number and the unique identifier value.

13. The system as in claim 1, wherein the response message communicated to the wireless access point includes a first random number;
    wherein the response message is a first response message; and
    wherein the authentication server is further operable to: i) generate a second response message to the wireless access point, the second response message including a second random number and the unique identifier value; and ii) communicate the second response message to the wireless access point.

14. The method as in claim 1 further comprising:
receiving the request message at the authentication server in response to the mobile device initiating the authentication session through the wireless access point to the authentication server.

15. The method as in claim 1, wherein the unique identifier value includes a portion of data that is different than an identifier assigned to the authentication server and an identifier assigned to the mobile communication device, the unique identifier value uniquely identifying the authentication session from multiple other authentication sessions supported by the authentication server.

16. The method as in claim 15, wherein the unique identifier value is absent from the request message transmitted from the wireless access point to the authentication server to authenticate the mobile communication device.

17. The method as in claim 1, wherein the unique identifier value is absent from the request message received from the wireless access point to authenticate the mobile communication device.

18. The method as in claim 1, wherein the supplemental data is a random number value.

19. A system comprising:
a wireless access point;
an authentication server operable to:
authenticate a mobile communication device;
assign a unique identifier value to an authentication session of authenticating the mobile communication device; and
communicate a response message to the wireless access point, the response message including: a) the unique identifier value assigned to the authentication session, the unique identifier value being a unique authentication session identifier and b) supplemental data with respect to the unique identifier value, wherein the supplemental data is different from the unique authentication session identifier; and
wherein the wireless access point echoes the unique authentication session identifier and the supplemental data provided by the authentication server in a respective reply message transmitted from the wireless access point to the authentication server, the wireless access point communicating the reply message in response to receiving the response message from the authentication server, a combination of the unique authentication session identifier value and the received supplemental data being used to track the response message and the reply message associated with the request message.

20. The system as in claim 19, wherein the authentication server is further operable to:
store the response message in a repository; and
utilize the unique identifier value to track multiple messages associated with the authentication session.

21. The system as in claim 19, wherein the authentication server is further operable to:
insert the unique identifier value in a data field of the response message to the wireless access point, the wireless access point operable to use the unique identifier value in the response message to identify multiple messages associated with the authentication session.

22. The system as in claim 19, wherein the unique identifier value is extra data with respect to network address information in the response message.

23. The system as in claim 19, wherein the authentication session identifier value is extra data with respect to a network address of the mobile communication device and a network address of the authentication server.

24. Computer-readable storage hardware having instructions stored thereon, the instructions, when carried out by computer processor hardware, cause the computer processor hardware to:
receive a request message from a wireless access point to authenticate a mobile communication device;
assign a unique identifier value to an authentication session of authenticating the mobile communication device; and
communicate a response message to the wireless access point, the response message including: a) the unique identifier value assigned to the authentication session, the unique identifier value being a unique authentication session identifier and b) supplemental data with respect to the unique identifier value, wherein the supplemental data is different from the unique authentication session identifier; and
wherein the wireless access point echoes the unique authentication session identifier and the supplemental data provided by the authentication server in a respective reply message transmitted from the wireless access point to the authentication server, the wireless access point communicating the reply message in response to receiving the response message from the authentication server, a combination of the unique authentication session identifier value and the received supplemental data being used to track the response message and the reply message associated with the request message.

* * * * *

UNITED STATES PATENT AND TRADEMARK OFFICE
CERTIFICATE OF CORRECTION

PATENT NO. : 10,477,397 B2  
APPLICATION NO. : 15/983698  
DATED : November 12, 2019  
INVENTOR(S) : Qiang Zhang et al.

Page 1 of 1

It is certified that error appears in the above-identified patent and that said Letters Patent is hereby corrected as shown below:

In the Claims

In Column 19, Claim 1, Line 42, after "unique identifier" insert --value being a unique authentication session identifier, b)--

In Column 19, Claim 1, Line 48, after "supplemental data" insert --provided by the authentication server in a respective reply message--

In Column 19, Claim 1, Line 50, after "reply message" insert --in response to receiving the response message from the--

In Column 21, Claim 19, Line 26, before "authenticate" insert --receive a request message from the wireless access point to--

Signed and Sealed this  
Fourth Day of February, 2020

Andrei Iancu  
*Director of the United States Patent and Trademark Office*